July 3, 1956  T. C. COULTERS  2,752,950
CONNECTION MEANS FOR HEATING AND VENTILATING DUCTS
Original Filed Sept. 8, 1950

INVENTOR
THOMAS CAREY COULTERS
BY Oldham & Oldham
ATTORNEYS

United States Patent Office 2,752,950
Patented July 3, 1956

2,752,950

CONNECTION MEANS FOR HEATING AND VENTILATING DUCTS

Thomas Carey Coulters, Cuyahoga Falls, Ohio

Original application September 8, 1950, Serial No. 183,863, now Patent No. 2,709,454, dated May 31, 1955. Divided and this application May 12, 1953, Serial No. 354,491

2 Claims. (Cl. 138—25)

This invention relates to improved heating and ventilating ducts and, more particularly, to a prefabricated, knocked-down duct which can be assembled at the time and place of installation.

It is the usual practice in the construction and installation of heating ducts and the like to fully form the ducts in the sheet metal shop and to thereafter install the fully formed ducts on location. This has necessitated a most careful measuring and estimating operation on location followed by shop fabrication. Then the fully formed ducts must be transported to the job and this is inefficient because, although the ducts are light in weight, they are very space-consuming. Once on the job, considerable cut and try is often required unless the measuring and estimating operation has been extremely well done. Additionally, any changes required may require return to the sheet metal shop.

It has been proposed to provide knocked-down duct sections of a plurality of selected types which can be assembled on the job to meet the duct requirements of any given installation, but such proposals have not met with commercial success, so far as I am aware, because of a number of reasons including complications of assembly, lack of adequate flexibility to meet construction requirements, expense, and lack of air tightness after assembly.

It is the general object of my invention to avoid and overcome the foregoing and other difficulties of and objections to prior art practices by the provision of a duct for air or other gases made from prefabricated sheet metal parts which may be easily assembled without special tools or equipment at the place of installation.

Another object of my invention is to provide a relatively inexpensive, leak-proof duct which can be constructed in a variety of shapes and sizes from preselected stock parts.

Another object of my invention is to provide a structure of the type described and made in cross-sectionally rectangular form for space-saving placement between joists and rafters.

Another object of my invention is the provision of a heating and ventilating duct which can be assembled from stock parts on location to meet any of a variety of requirements and in which stabbing of parts together during assembly is facilitated.

The aforesaid objects of the invention, and other objects which will become apparent as the description proceeds, are achieved by providing a duct comprising a plurality of units, each unit having a pair of channels comprising the sides, and a pair of flat sheet strips for the top and bottom thereof, a flattened S-shaped margin integrally formed along the longitudinal edges of the channels adapted to receive the longitudinal edges of the flat sheet strips, a loop along the transverse edges of the flat sheet strips, a connector or cleat for clipping the units together end to end and engaging the loops of said flat sheet strips forming the top and bottom of adjacent units, means for securing the connectors against lateral movement when in assembled position, the channels terminating in tongues, said tongues of adjacent units lying in overlapping relationship when the units are clipped together, and a flattened S-shaped connector engaging the overlapping tongues to further secure and completely seal the connection joints between adjacent units.

For a better understanding of the invention, reference should be had to the accompanying drawings, wherein.

Figure 1:
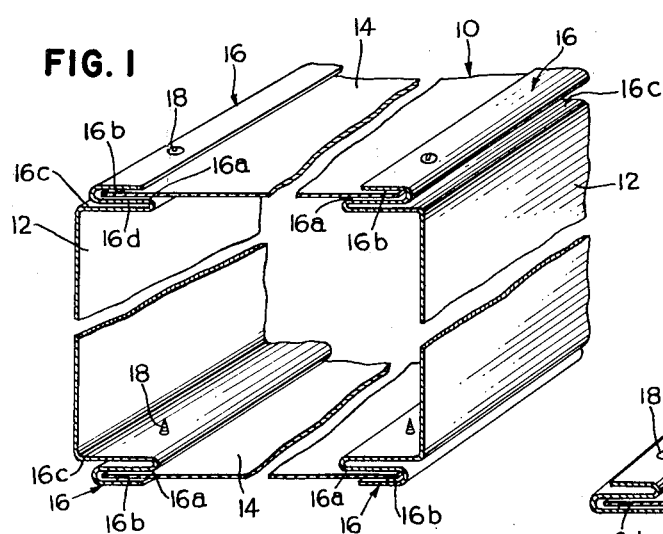
Fig. 1 is a fragmentary sectional view in perspective of one embodiment of the invention showing the longitudinal joint construction forming a unit.

With specific reference to the form of the invention illustrated in the drawings, the numeral 10 indicates generally a duct assembly or unit made of sheet metal or the like including side channels 12 and top and bottom sheet strips 14. The longitudinal edges of the channels 12 are constructed with a double reverse bend forming an integral flattened S-shaped margin shown generally at 16. In order to allow for clearer illustration in the drawings, the margins 16 have not been shown as flattened as they are in actual construction.

Assembly of the duct unit is effected by stabbing the opposing longitudinal edges of the top and bottom sheet strips 14 into the slots provided by the S-shaped margins 16 along the longitudinal edges of the channels 12. The units can be made in either of the two alternative forms shown in Figures 1 and 2, depending upon which loop of the S-shaped margin 16 is used in securing the channel 12 to the sheet strip member 14. Sheet metal screws 18 are used to secure the unit after assembly.

It is to be understood that the channels 12 and sheet strips 14 can be made up in a variety of lengths and widths whereby units can be made up of any desired length, width, and depth.

The use of double grooves as provided by the margins 16 allows two or more ducts to be positioned side by side with a common wall or walls if this be desired in any installation.

Figure 3:
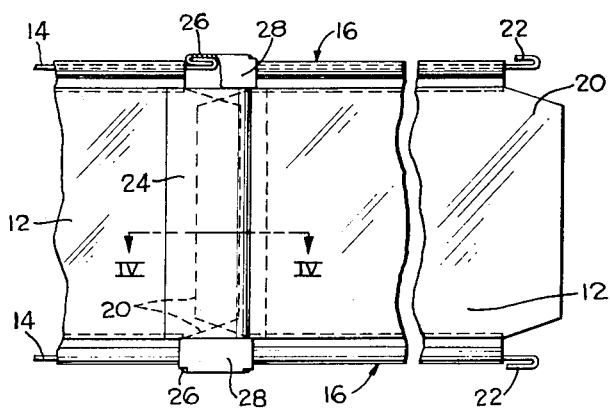
Fig. 3 is a fragmentary side elevational view, partly in section, showing details of the joint construction between the channels of adjacent units.

A duct of any desired length can be made by joining a number of units 10 together, as illustrated in Fig. 3. The ends of the channels 12 terminate in projecting tongues 20; the top and bottom sheet strips 14 terminate on each end in a reverse-fold loop 22. When two enclosure units 10 are brought in end-to-end relationship to form a continuous duct, the tongues 20 of adjacent channels 12 are in overlapping relationship as shown in Fig. 4, while the folded loops 22 of adjacent top and bottom sheet strips 14 are substantially in abutment.

Figure 4:
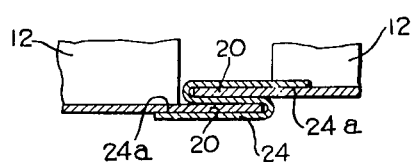
Fig. 4 is an enlarged fragmentary sectional view taken substantially on line IV—IV of Fig. 3 showing the flattened S-shaped connector which joins in end-to-end relation the overlapping tongues of adjacent channels, all parts being shown of exaggerated thickness to allow for better illustration.
Figure 6:
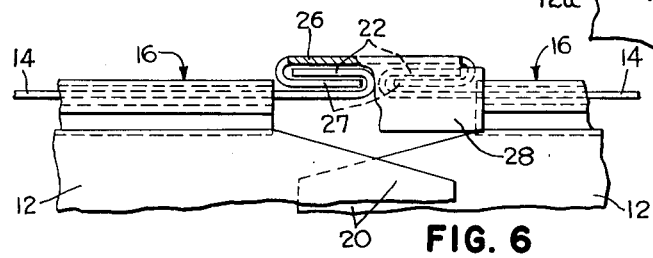
Fig. 6 is an enlarged fragmentary side elevational view, partly in section, of the joint construction of Fig. 3 but with the S-shaped connector removed.
Figure 5:
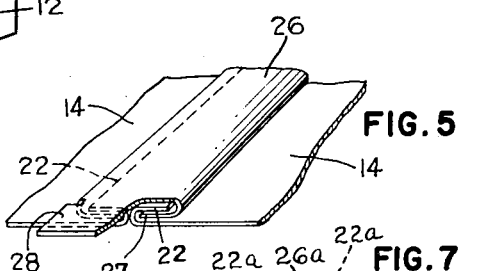
Fig. 5 is an enlarged fragmentary perspective view, partly in section, illustrating in the construction of the connector joining adjacent flat top and bottom walls of the cut in end-to-end relation.

To insure a rigid and sealed joint between adjacent overlapping tongues 20 of channels 12, the tongues are stabbed into a flattened S-shaped connector 24, as best shown in Fig. 4. The ends of the strips 14 of adjacent units 10 are secured in end-to-end relationship by cleats or connectors 26, as best seen in Figs. 5 and 6. The connectors 26 are formed with inwardly turned edges 27 which engage the abutting loops 22 on the ends of strip 14. In order to secure the connectors 26 after they are slid into the assembled position, tabs 28 extending beyond and integrally formed with the ends of the connector 26 are bent down through 90° over the open ends of the loops 2. The tabs 28 also, are pressed against the edges of the tongues 20 and connectors 24 to aid in sealing such connection. The tabs 28 by extending laterally beyond the margins of the remainders of the connectors 26 and in sealing the ends of the grooves 16.

Figure 2:
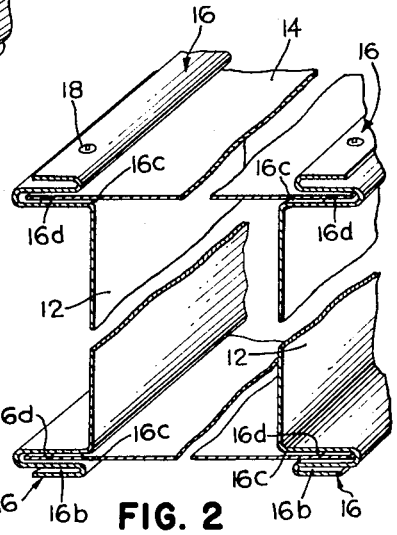
Fig. 2 is a view similar to Fig. 1 showing an alternative form of the assembled duct unit.

An important feature of my invention is that all parts to be stabbed together, that is any flattened S-shaped connectors or margins, include a shelf in direct alignment with the groove into which the part is to be stabbed. Thus, having reference to Figures 1 and 2 and the margins 16, a shelf or shoulder 16$^a$ is provided in Fig. 1 on which the edge of the sheet metal strips 14 can rest to be aligned thereby to facilitate stabbing or moving the edges of the strips 14 into the grooves 16$^b$ of Fig. 1. Similarly, and as shown in Fig. 2, shelves 16$^c$ are provided for facilitating stabbing of the edges of strips 14 into grooves 16$^d$ of margins 16. Likewise, shelves 24$^a$ are provided on each edge of connectors 24 for facilitating stabbing tongues 20 into grooves of the connector.

From the foregoing description, it will be seen that a number of enclosure units can be readily and inexpensively made up from pre-formed channels and flat sheet strips, which can then be joined and clipped securely in end-to-end relationship to make a continuous leak-proof duct for air or other gases.

Figure 7:
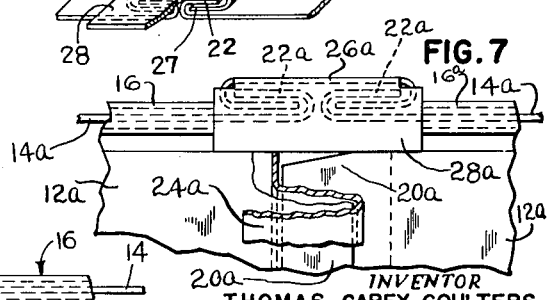

Fig. 7 shows a modification of the invention wherein channels 12$a$ are provided with overlapping tongues 20$a$ that have overlapped sections of the height of the web of the channels. An S-hook connector 24$a$ engages these tongues 20$a$ while connectors 26$a$ engage ends 22$a$ of strip members 14$a$ to complete the duct joint. End tabs 28$a$ of the connectors 26$a$ are bent over the ends 22$a$ and lie flush against ends of the S-shaped margins 16 of the channels 12$a$ and bear on the edges of the S-hook connectors 24$a$. The end tabs 28$a$ can be worked, or shaped as required when folded over to best seal the channel margins 16$a$ and to seal against the ends of the connectors 24$a$. Thus as air-tight a connection as is possible without soldering is provided and no screws or other similar securing means are required in the connecting means.

This application is a division of my co-pending application S. N. 183,863, now Patent No. 2,709,454, May 31, 1955.

While in accordance with the patent statutes, one best known embodiment of my invention has been illustrated, it is to be understood that I am not to be limited thereto or thereby, but that the scope of my invention is defined in the appended claims.

I claim:

1. Sheet metal ducts for air and the like and including in combination, a pair of ducts having a quadrangular shape in cross section and positioned in end to end relation, each duct having a pair of opposed channel-shaped portions and a pair of opposed flat portions to complete each duct, the edges of the channel-shaped portions receiving and being secured to the edges of the opposed flat portions and with corresponding portions of the ducts being aligned with each other, said channel-shaped portions in said ducts having projecting flat tongues on the ends thereof positioned in overlapping relation, flattened S-shaped connectors receiving and sealing the overlapping tongues together, said flat portions of said ducts each having a turned back edge on the ends thereof transversely aligned in the ducts with said connectors and with corresponding turned back edges on the pair of ducts being adjacent each other, and flattened C-shaped cleats engaging the adjacent turned back edges on said ducts and sealing together the adjacent edges of the two opposed flat portions on said ducts, each cleat having an extension on each end folded down and extending over the ends of the connectors to cover and substantially seal the corners of said ducts between the cleats and the connectors in the space provided by the flanges on said channels.

2. Sheet metal ducts as in claim 1 wherein said channel flanges are of flattened S-shape in section.

References Cited in the file of this patent

UNITED STATES PATENTS

| | | |
|---|---|---|
| 726,004 | Stein et al. | Apr. 21, 1903 |
| 760,216 | Laws | May 17, 1904 |
| 1,356,022 | Smith | Oct. 19, 1920 |
| 1,934,330 | Ruppelt | Nov. 7, 1933 |
| 1,935,690 | Zack | Nov. 21, 1933 |
| 2,498,753 | Deitsch | Feb. 28, 1950 |
| 2,627,430 | Koffler | Feb. 3, 1953 |